United States Patent
Kang

(10) Patent No.: US 7,563,041 B2
(45) Date of Patent: Jul. 21, 2009

(54) CAMERA MODULE WITH BRIGHTNESS ADJUSTABLE LCD SHUTTER IN PORTABLE WIRELESS TERMINAL

(75) Inventor: Bum-Suk Kang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 518 days.

(21) Appl. No.: 11/239,951

(22) Filed: Sep. 30, 2005

(65) Prior Publication Data

US 2006/0077279 A1    Apr. 13, 2006

(30) Foreign Application Priority Data

Oct. 11, 2004    (KR) .................... 10-2004-0080863

(51) Int. Cl.
*G02F 1/00* (2006.01)
(52) U.S. Cl. ..................................... 396/506
(58) Field of Classification Search ................. 396/506, 396/223, 290, 296, 205, 301, 203, 221, 280
See application file for complete search history.

(56) References Cited

U.S. PATENT DOCUMENTS

| | | | |
|---|---|---|---|
| 3,972,733 A * | 8/1976 | Kamei et al. ................ | 136/263 |
| 6,856,353 B1 * | 2/2005 | Misawa ................ | 348/333.07 |
| 6,867,821 B2 * | 3/2005 | De Schipper ................ | 349/28 |
| 6,967,647 B2 * | 11/2005 | Nokiyama .................... | 345/204 |
| 2003/0067613 A1 * | 4/2003 | Ishikawa et al. ............. | 356/614 |
| 2004/0189566 A1 * | 9/2004 | Nakamura et al. ............ | 345/87 |
| 2006/0140353 A1 * | 6/2006 | Jung ........................... | 379/52 |
| 2007/0127120 A1 * | 6/2007 | Onuki et al. ................ | 359/448 |
| 2007/0136208 A1 * | 6/2007 | Hamashima et al. .......... | 705/62 |

* cited by examiner

*Primary Examiner*—Jay M Patidar
(74) *Attorney, Agent, or Firm*—The Farrell Law Firm, LLP

(57) ABSTRACT

Disclosed herein is a portable wireless terminal with a camera module, which includes a camera lens assembly installed in a main board of the portable wireless terminal, an object photographing opening formed corresponding to the camera lens assembly on a case frame of the portable wireless terminal, and a liquid crystal panel fixed in the object photographing opening and constructed so that the liquid crystal panel's brightness is adjustable by a selective application of a driving power source of the portable wireless terminal to liquid crystal of the liquid crystal panel, whereby the camera module can be efficiently used by a shutter function of the liquid crystal panel and a security function in a security zone is also provided.

4 Claims, 4 Drawing Sheets

CAMERA MODULE WITH BRIGHTNESS ADJUSTABLE LCD SHUTTER IN PORTABLE WIRELESS TERMINAL

PRIORITY

This application claims priority under 35 U.S.C. § 119 to an application entitled "Camera Module With LCD Shutter In Portable Wireless Terminal" filed in the Korean Intellectual Property Office on Oct. 11, 2004 and assigned Ser. No. 2004-0080863, the contents of which are incorporated herein by reference.

BACKGROUND OF THE INVENTION

1. Field of the Invention

The present invention relates to a camera module installed in a portable wireless terminal, and more particularly, to a camera module with a Liquid Crystal Display (LCD) shutter in a portable wireless terminal, in which the LCD shutter has a shutter function and the liquid crystal panel's brightness is adjustable according to users' tastes.

2. Background of the Prior Art

With gradual popularization of portable wireless terminals, various functions and designs of portable wireless terminals have been launched. Portable wireless terminals that have been developed include a bar type terminal, a flip type terminal, a flip-up type terminal and a folder type terminal. Recently, the folder type terminal has been widely used because it has sufficient space for mounting of a wide LCD module as a display device, and can be carried in a folded state to thereby provide superior portability, as compared to other types of terminals. More recently, a slide type terminal, which is opened in such a way that its sub-body is slid on its main body in its length or width direction, has been launched to satisfy various users' tastes.

Also, development of the electronic communication industry has allowed portable wireless terminals to gradually become lightweight, small-sized and multi-functional. Examples of the multi-functions include a speaker function capable of reproducing various chords of melodies and high-quality color display functions capable of reproducing hundreds of thousands to millions of pixels, which are being further developed competitively.

In addition, portable wireless terminals are being equipped with various functions corresponding to the high-quality color display function, such as an optical photographic device used for image communication, used as a digital camera or used a camcorder. A small-sized camera lens assembly is generally used as the optical photographic device. The small-sized camera lens assembly is installed in a Radio Frequency (RF) board (i.e. main board) of the terminal in a Surface Mounted Device (SMD) type device. While the camera lens assembly has been detachably attached to the terminal, it recently is being built-in at a proper place of the terminal.

A camera module includes a camera lens assembly installed in a main board of a portable wireless terminal, and a plastic or glass transparent window installed at a corresponding position on a case frame of the terminal. The window prevents malfunction of the terminal and the camera lens assembly often caused by an inflow of impurities, such as dust, into the terminal.

However, the camera module is additionally installed in the terminal and lacks a separate shutter. Further, in a security zone, the terminal should be covered with a protective vinyl cover so as to prevent unauthorized photographing. In this case, the protective vinyl cover may damage the exterior of the terminal and cause inconvenience when a user seeks to use other functions, such as a calling function.

SUMMARY OF THE INVENTION

The present invention provides a camera module with an LCD shutter in a portable wireless terminal, in which a user can perform a shutter function by a simple manipulation.

Also, the present invention provides a camera module with an LCD shutter in a portable wireless terminal, which can be physically and simply controlled so that the photographing using the camera module is prevented in a security zone.

Further, the present invention provides a camera module with an LCD shutter in a portable wireless terminal, which can facilitate an efficient use of a camera function.

According to an aspect of the present invention, a camera module of a portable wireless terminal includes a camera lens assembly installed in a main board of the portable wireless terminal; an object photographing opening formed corresponding to the camera lens assembly on a case frame of the portable wireless terminal; and a liquid crystal panel fixed in the object photographing opening and constructed so that the liquid crystal panel's brightness is adjustable by selective application of a driving power source of the portable wireless terminal to liquid crystal of the liquid crystal panel.

The liquid crystal panel may be installed on the portable wireless terminal's case frame to thereby prevent impurities such as dust from flowing into the portable wireless terminal, and also can act as a liquid crystal shutter by an application of the portable wireless terminal's power source.

According to another aspect of the present invention, a portable wireless terminal having a camera module for photographing an object by a liquid crystal panel includes a camera module driver for driving the camera module; a controller for generating a control signal used to drive the cameral module according to a user's key input during an object photographing by the camera module; a power supply for supplying a power source to the camera module according to the control signal; and a liquid crystal driver for driving the liquid crystal panel so that the liquid crystal panel's brightness is adjustable by a selective application of the power source to the liquid crystal panel according to the control signal.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detailed description of well known features will be omitted for clarity.

Although a Personal Digital Assistant (PDA) type terminal is illustrated and described in this document, one of skill in the art will recognize that a liquid crystal panel according to the present invention can be applied to various kinds of terminals equipped with a small-sized camera lens assembly.

Figure 1:
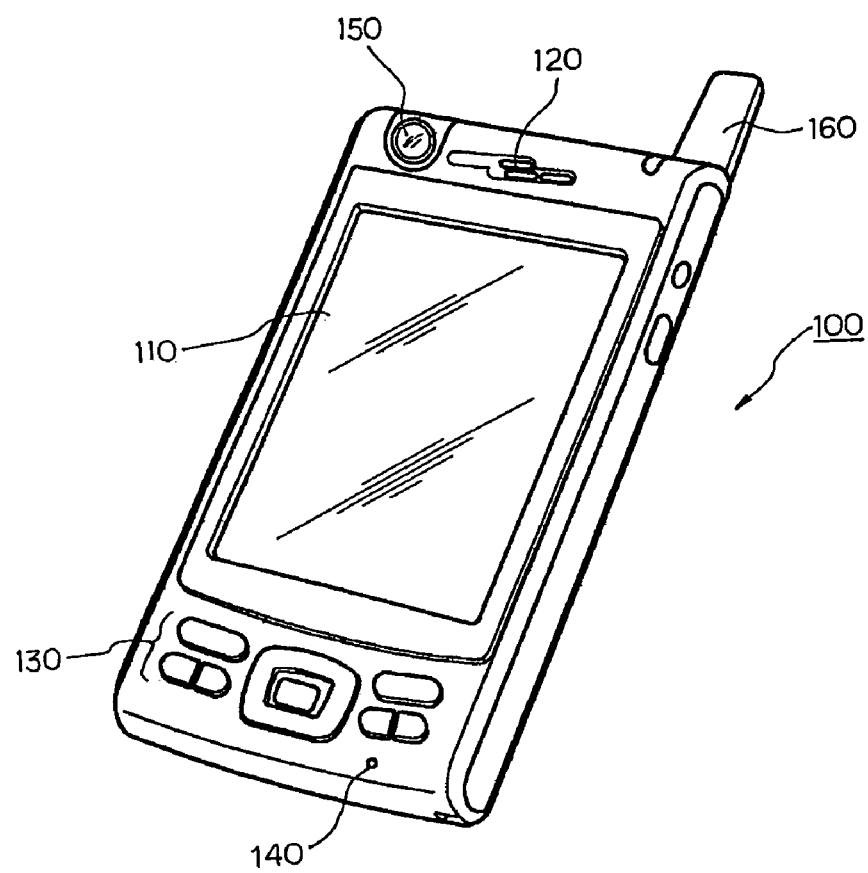
FIG. 1 is a perspective view of a portable wireless terminal with an LCD shutter according to an embodiment of the present invention.

FIG. 1 is a perspective view of a portable wireless terminal with an LCD shutter according to an embodiment of the present invention.

Referring to FIG. 1, a display unit 110 is installed on a front side of a portable wireless terminal 100. The display unit 110 is preferably a wide LCD module. The wide LCD module is a touch-screen type module, preferably a wide color touch-screen module. An earpiece 120 with a speaker, which enables broadcast of a voice from a calling partner, is installed over the wide LCD module. Also, a key button assembly 130 can be installed under the wide LCD module. The key button assembly 130 may be numeric key buttons or scroll type key buttons, preferably a navigation keypad. A microphone 140, which enables transmission of a voice to a calling partner, is installed under the key button assembly 130. An antenna 160 is installed on the top of the portable wireless terminal 100. The antenna 160 is preferably a fixed helical antenna but may be a retractable whip antenna according to the terminal type and required radiation characteristics.

A camera module 150 with a liquid crystal panel according to the present invention, which enables various auxiliary functions such as a photographing function, is installed at one side of an upper part of the portable wireless terminal 100. Accordingly, when a camera module is required for an LCD shutter function, the terminal 100 makes the liquid crystal panel transparent by automatically interrupting a power source applied to the liquid crystal panel to thereby enable photographing, and then makes the liquid crystal panel opaque by automatically applying the power source to the liquid crystal panel upon termination of the use of the camera module, to thereby enable a camera shutter function.

Figure 2:
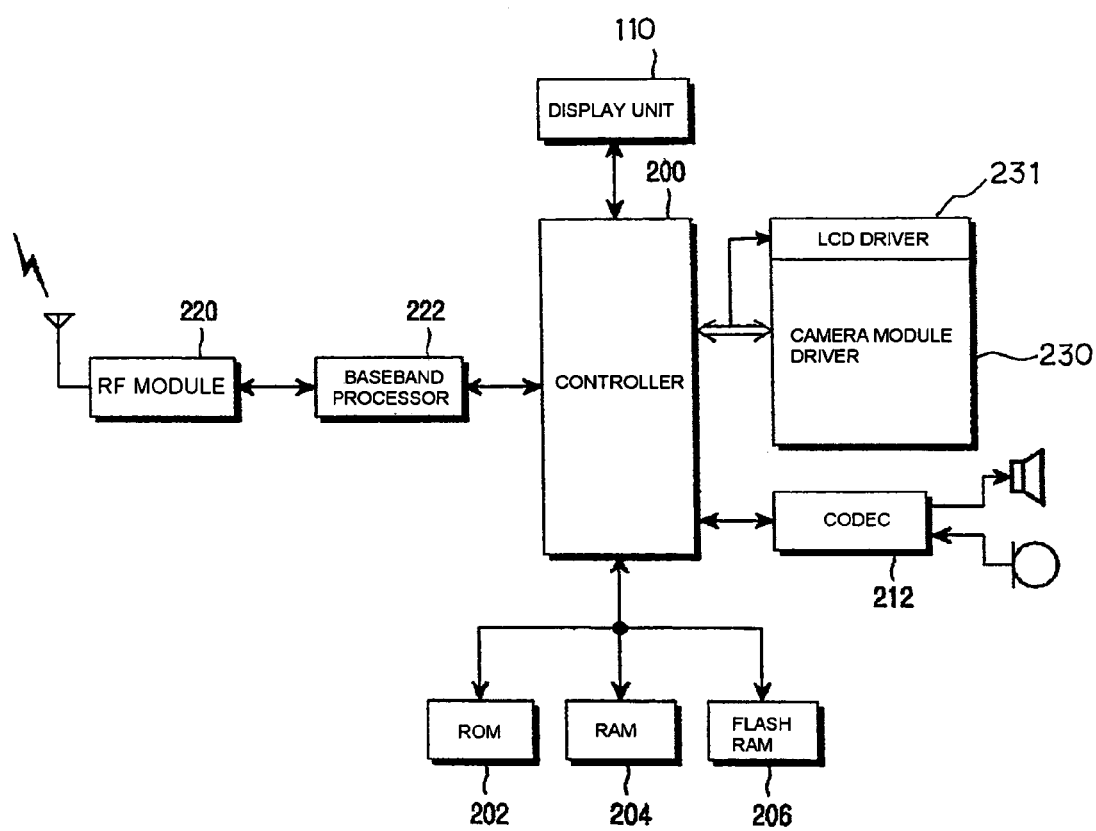
FIG. 2 is a block diagram of a portable wireless terminal according to an embodiment of the present invention.

FIG. 2 is a block diagram of the portable wireless terminal according to an embodiment of the present invention.

Referring to FIG. 2, a controller (or a microprocessor unit) 200 controls the overall operation of the portable wireless terminal 100. For example, the controller 200 performs general operations such as processing and controlling operations for voice communication and data communication, and controls an LCD driver 231 in addition to the general operations. For example, when performing a camera function by applying a control signal to a camera module driver 230, the controller 200 drives a liquid crystal panel 10 (shown in FIG. 3) by applying a control signal to the LCD driver 231. The LCD driver 231 may be implemented by a well-known switching device. Accordingly, when an applied power source is interrupted by the controller 200, the liquid crystal panel 10 changes from an opaque state for an initial shutter function into a transparent state of the conventional transparent window, to thereby facilitate photographing of an object.

A Read Only Memory (ROM) 202 stores various reference data and micro-codes of a program for the processing and controlling operations of the controller 200. A Random Access Memory (RAM) 204 is a working memory of the controller 200, which stores temporary data generated during the performance of various programs. A flash RAM 206 stores various updatable data such as a scheduler and a phone book.

The key button assembly 130 includes 0 through 9 numeric keys, a menu key, a confirmation key, a character transmission key, a talk key, a clear key, an end key, a * key, a # key and navigation keys (up, down, left, right), and provides key input data corresponding to a key pressed by a user to the controller 200. The key button assembly 130 may further include an object photographing key button and a key button for varying the brightness of the liquid crystal panel 10.

A display unit 110 displays state information generated during the operation of the portable wireless terminal 100, can display a restricted number of characters and can also display moving and still pictures. The display unit 110 may be an LCD module, preferably a wide color LCD module having hundreds of thousands to millions of pixels.

A CODEC (COder-DECoder) 212 connected to the controller 200, and a speaker and a microphone connected to the CODEC 212 constitute a voice I/O block used for a telephone call and voice recording. The CODEC 212 converts Pulse Code Modulation (PCM) data received from the controller 200 into an analog voice signal and then outputs the analog voice signal through the speaker, and converts an analog voice signal received through the microphone into PCM data and then provides the PCM data to the controller 200.

An RF module 220 down-converts an RF signal received through an antenna to then provide the resulting signal to a baseband processor 222, and up-converts a baseband signal received from the baseband processor 222 to then transmit the resulting signal through the antenna. The baseband processor 222 processes baseband signals exchanged between the RF module 220 and the controller 200. For example, the baseband processor 222 channel-codes and spreads a transmission signal, and despreads and channel-decodes a received signal.

Figure 3:
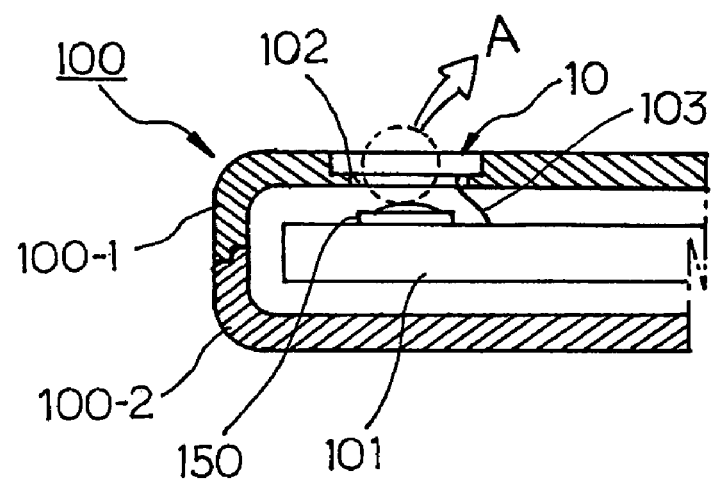
FIG. 3 is a sectional view illustrating a manner of installation of a camera module with an LCD shutter according to an embodiment of the present invention.

FIG. 3 is a sectional view illustrating a manner of installation of the camera module with the LCD shutter according to an embodiment of the present invention.

Referring to FIG. 3, the portable wireless terminal 100 is constructed to include an upper case frame 100-1 and a lower case frame 100-2. A main board 101 (i.e. an RF board) is installed in the portable wireless terminal 100. A camera lens assembly 150 (or camera module 150) is installed on the main board 101. Preferably, the camera lens assembly 150 is installed in an SMD type device. An object photographing opening 102 is formed at a position corresponding to the position of the camera lens assembly 150 on the upper case frame 100-1. Accordingly, the camera lens assembly 150 can perform an object photographing function through the object photographing opening 102.

The liquid crystal panel 10 is fixedly installed in the object photographing opening 102. The liquid crystal panel 10 can be fixed by an adhesive, supersonic waves or heat. A power source is applied to the liquid crystal panel 10, whereby the liquid crystal panel 10 can be electrically connected to the main board 101 through a power source connecting unit 103. The power source connecting unit 103 may be a Flexible Printed Circuit (FPC) or a thin cable. Accordingly, the liquid crystal panel 10 can act not only as the conventional transparent window, but also as an LCD shutter.

Figure 4:
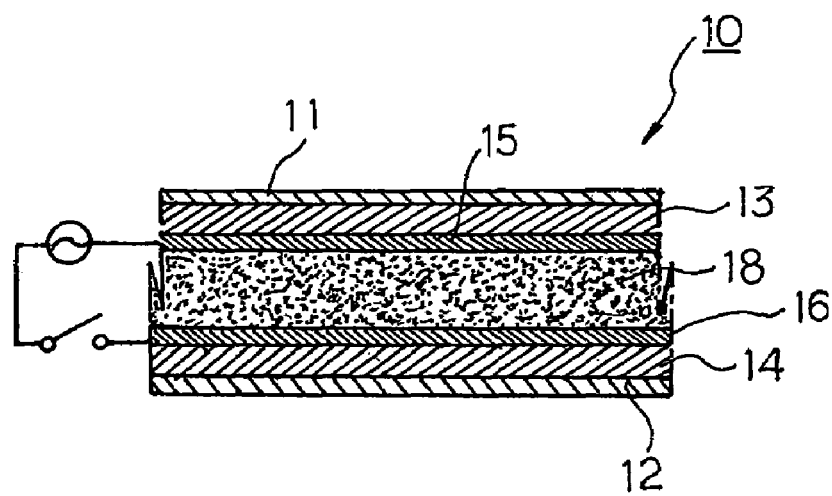
FIG. 4 is a detailed sectional view of a portion "A" shown in FIG. 3.

FIG. 4 is a detailed sectional view of a portion "A" shown in FIG. 3.

In general, liquid crystal in a solid state is melted by heat to thereby become liquid crystal in a liquid state, which exhibits an anisotropy characteristic such as birefringence. That is, since liquid crystal is irregular in its molecular arrangement in one direction as a liquid and is regular in its molecular arrangement in another direction as a solid, the liquid crystal is considered an anisotropic liquid. For example, when p-azoxyanisole crystal is heated, the p-azoxyanisole crystal becomes liquid crystal at 116° and becomes a liquid at 134°. The liquid crystal can be made by cholesterin benzoate, p-azoxyphenetol, a p-methoxy cinnamate or sodium oleate.

Referring to FIG. 4, liquid crystal 18 is interposed between upper and lower electrode plates 15 and 16. The liquid crystal 18 can be one of the above-stated liquid crystal materials. Upper and lower transparent plates 13 and 14 are respectively attached on outer surfaces of the two electrode plates 15 and 16. Polarization plates 11 and 12 are respectively attached on outer surfaces of the upper and lower transparent plates 13 and 14.

The liquid crystal panel 10 may be a Twisted Nematic (TN) mode liquid crystal panel. In the TN mode liquid crystal panel, twistedly aligned liquid crystal cells are arranged between two polarization plates whose polarization axes are perpendicular to each other, and a light transmittance of the liquid crystal is changed according to whether a voltage is applied thereto. However, the liquid crystal panel 10 is not limited only to the TN mode liquid crystal panel. For example, the liquid crystal panel 10 may be a Guest-Host (GH) mode liquid crystal panel, an Electrically Controlled Birefringence (ECB) mode liquid crystal panel, a Phase Change (PC) mode liquid crystal panel or a Dynamic Scattering (DS) mode liquid crystal panel.

Accordingly, when a power source is applied to the liquid crystal panel 10 at normal times, the liquid crystal panel is normally opaque, and when the applied power source is interrupted during the display of an object through a display device in advance of photographing and during the photographing of the displayed object through the camera lens assembly 150, the liquid crystal panel becomes transparent, whereby an automatic LCD shutter function can be embodied.

As described above, the camera module equipped with the liquid crystal panel having the LCD shutter function enables a user to efficiently use the camera module.

The forgoing embodiments are merely exemplary and are not to be constructed as limiting the present invention. The present teachings can be readily applied to other types of apparatus. The description of the present invention is intended to be illustrative, and not to limit the scope of the claims. Many alternatives, modifications, and various will be apparent to those skilled in the art.

What is claimed is:

1. A portable wireless terminal with a camera module for photographing an object through a liquid crystal panel, the portable wireless terminal comprising:
    a camera module driver for driving the camera module;
    a controller for generating a control signal used to drive the camera module according to a user key input;
    a power supply for supplying a power source to the camera module according to the control signal; and
    a liquid crystal driver for driving the liquid crystal panel so that brightness of the liquid crystal panel is adjustable by a selective application of power to the liquid crystal panel according to the control signal.

2. The portable wireless terminal of claim 1, further comprising a display unit for displaying an object photographed by the camera module via the liquid crystal panel.

3. The portable wireless terminal of claim 1, wherein the camera module of the portable wireless terminal comprises:
    a camera lens assembly installed on a main board of the portable wireless terminal; and
    an object photographing opening formed on a case frame of the portable wireless terminal and positioned corresponding to the camera lens assembly;
    wherein the liquid crystal panel is fixed in the object photographing opening and constructed so that brightness of the liquid crystal panel is adjustable by a selective application of a driving power source of the portable wireless terminal to the liquid crystal of the liquid crystal panel.

4. The portable wireless terminal of claim 3, wherein the liquid crystal panel comprises:
    upper and lower transparent plates each having a polarization plate attached on an outer surface thereof; and
    upper and lower electrode plates to which the driving power source is applied, having the transparent plates respectively attached on an outer surface thereof;
    wherein the liquid crystal is interposed between the upper and lower electrode plates to control light transmittance.

\* \* \* \* \*